Patented Feb. 2, 1932

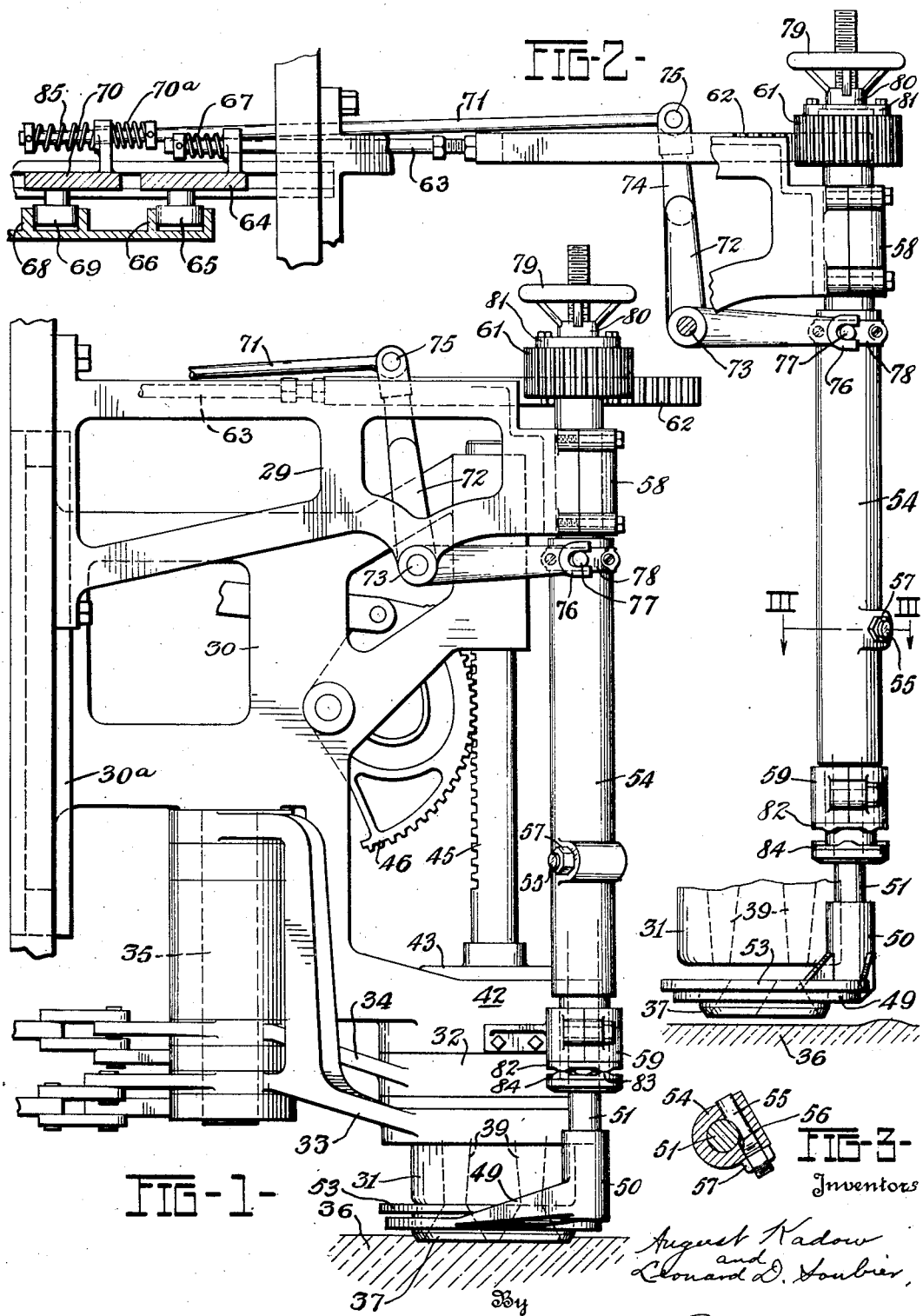

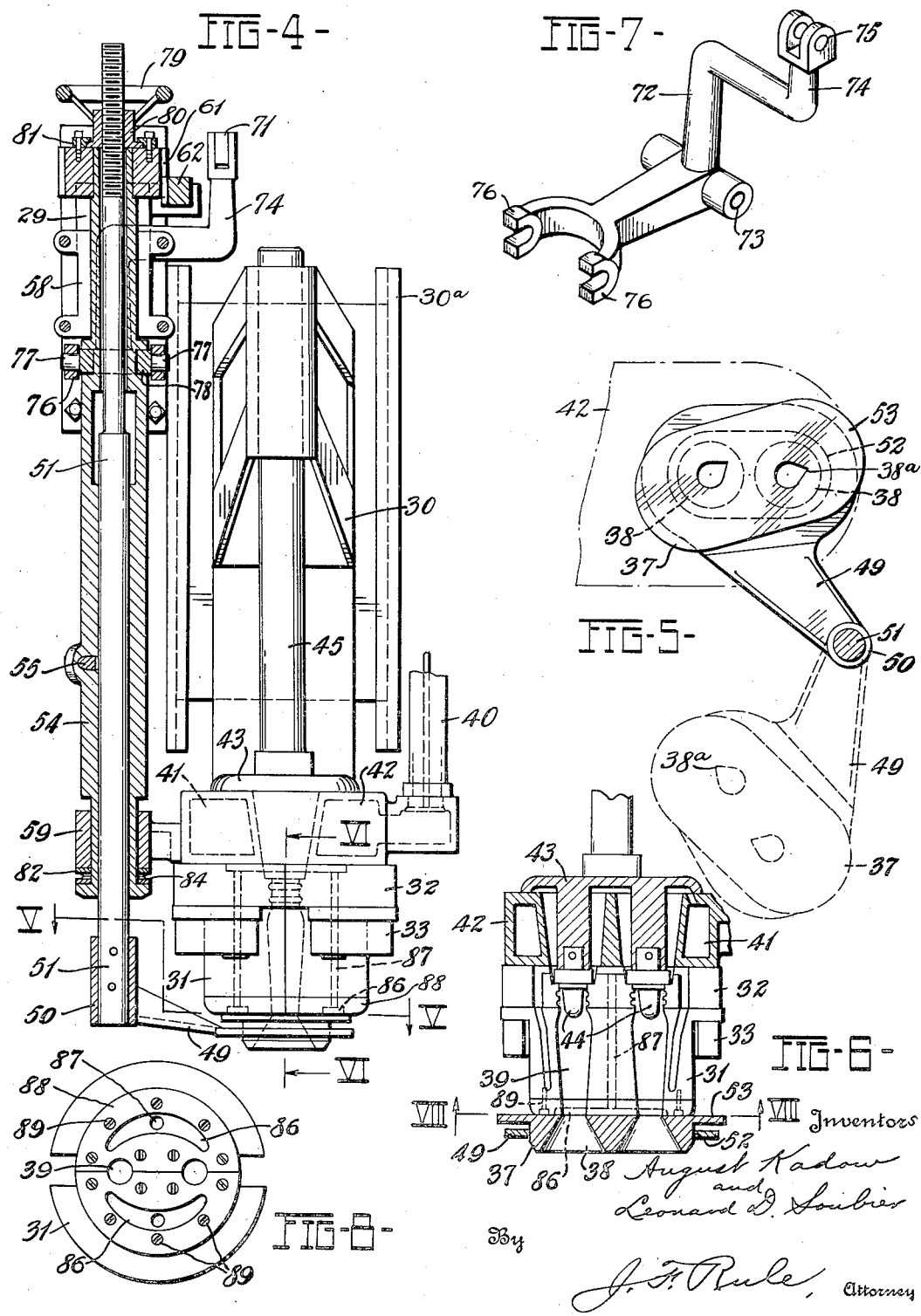

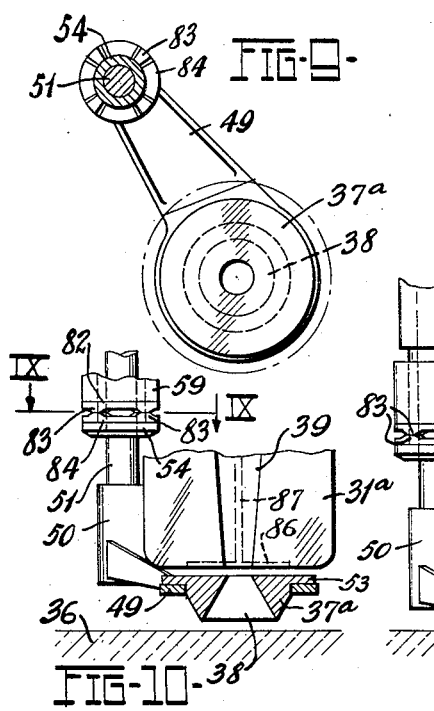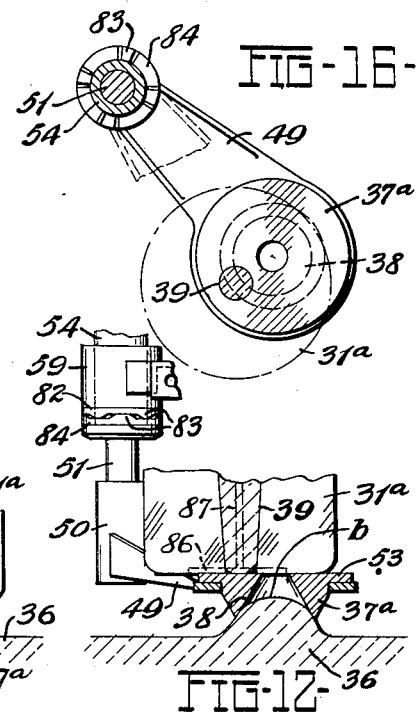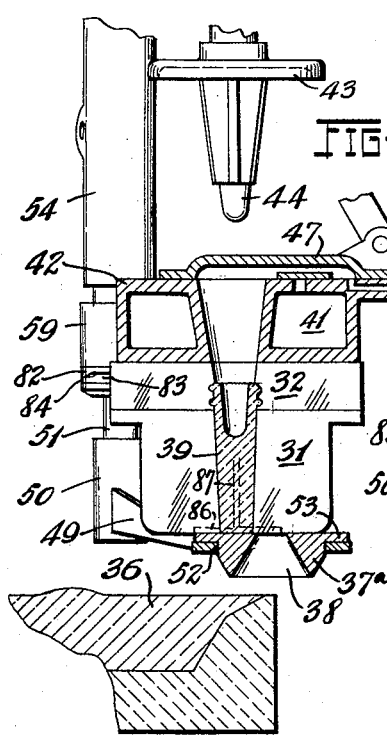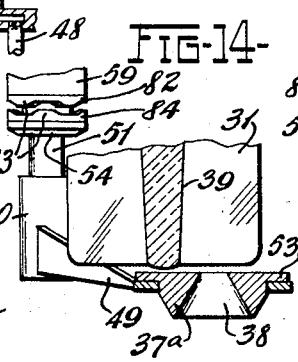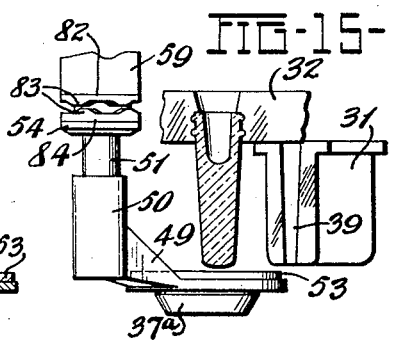

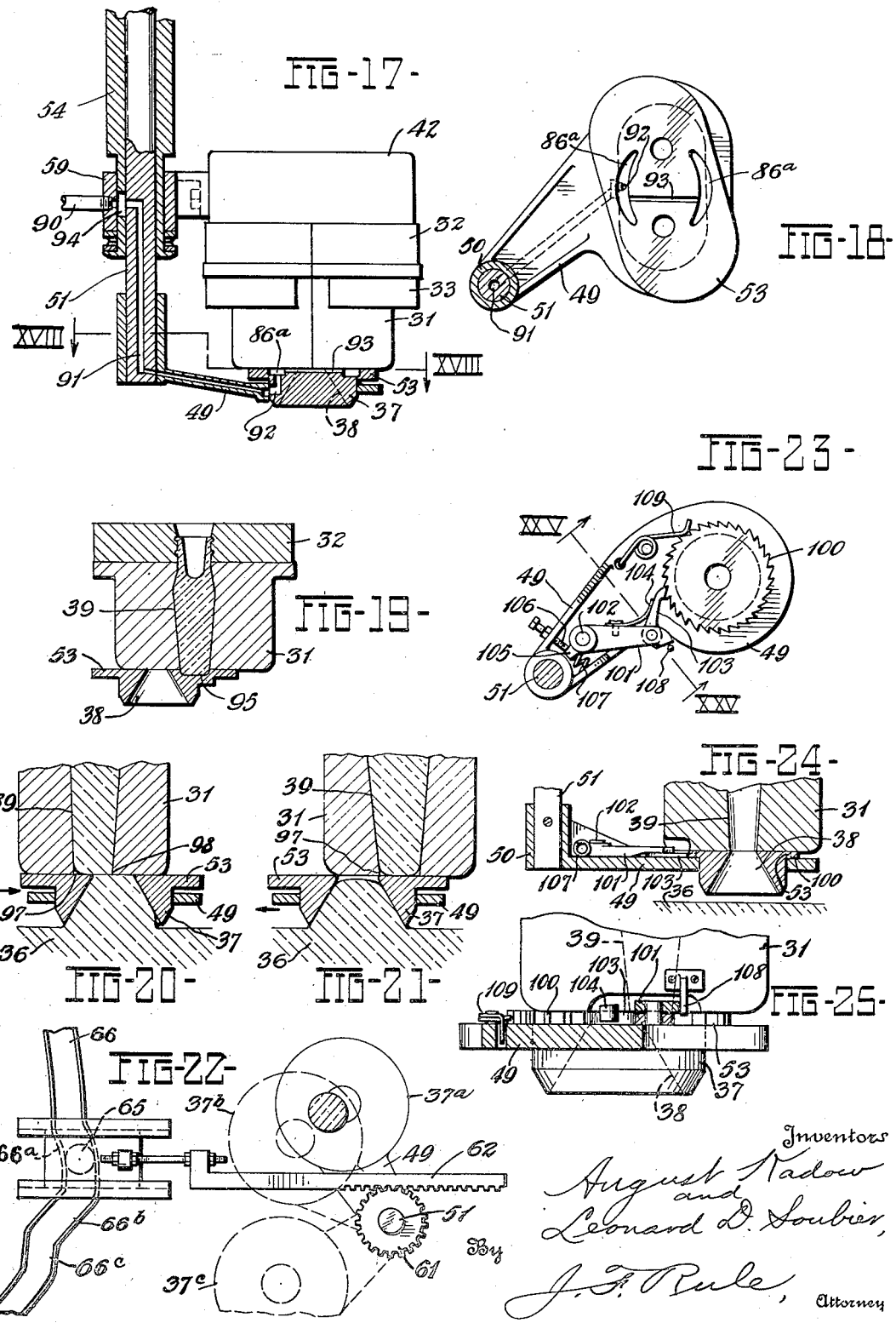

1,843,165

UNITED STATES PATENT OFFICE

AUGUST KADOW AND LEONARD D. SOUBIER, OF TOLEDO, OHIO, ASSIGNORS TO OWENS-ILLINOIS GLASS COMPANY, OF TOLEDO, OHIO, A CORPORATION OF OHIO

MACHINE FOR FORMING GLASS ARTICLES

Application filed July 9, 1928. Serial No. 291,181.

The present invention relates to machines for forming glassware, such as bottles, jars and other hollow articles which are formed in molds, and more particularly to machines of the type in which the molds are brought into association with a supply body of molten glass and the glass introduced by suction into the molds. Our invention relates, mainly, to apparatus for severing the charges of glass in the molds from the supply body of glass.

The general nature of the invention and the outstanding features thereof will perhaps be best understood by a brief comparison of the invention with the glass severing apparatus which is in general use at the present day with suction gathering machines. In machines of the suction gathering type, for forming bottles, jars and other hollow ware,—particularly machines of the Owens type,—the universal practice is to gather the charges of glass into blank molds by dipping the lower open ends of the molds into a tank or pool of molten glass and then exhausting the air from the molds so that they are filled by suction. Each mold after receiving its charge of glass is lifted a short distance above the surface of the pool of glass and a knife is swung across the bottom of the mold to sever the glass in the mold from the column or tail of glass extending from the mold to the pool. In order to make a clean severance of the glass, the cutter must be given a rapid stroke and must be held against the bottom of the mold during the cutting stroke. Various difficulties and objectionable features are encountered in this method of operation. The cutter at each stroke, strikes the bottom of the mold, causing rapid wear and chipping of the mold. The cutter is also quickly dulled. This wearing away of the mold reduces its length and accordingly reduces the capacity of the mold cavity which is a measure of the amount of glass introduced for each charge. This is a serious objection, because it is important that the volume of glass in the mold be maintained constant, so that the weight and capacity of the finished ware shall remain uniform. This reduction of the size of the mold cavity can be compensated for in a measure by cutting away the inner walls of the mold to increase the diameter of the mold cavity, but this is objectionable not only because of the time and labor required, but also because it changes the shape of the parison which is formed in the mold, whereas, in order to obtain the most suitable distribution of the glass in the finishing mold, it is necessary to give a predetermined shape to the parison in the gathering mold.

A further serious objection encountered with machines of the type above mentioned, results from the excessive heating of the molds caused by their contact with the supply body of molten glass during the gathering operation. This high temperature causes the walls of the mold cavity to scale and become rough, and necessitates frequent removal of the molds from the machine for polishing the mold cavities. This not only requires much time and labor, but also greatly interferes with production owing to the time required for changing the molds on the machine and bringing the comparatively cold molds up to a working temperature. This polishing of the molds is further objectionable because it also enlarges and changes the shape of the mold cavity.

An object of the present invention is to overcome the objections above pointed out, and to this end the invention comprises a cutter plate which is held in contact with the lower open end of the gathering mold while a charge of glass is introduced into the mold, said cutter plate having an opening therethrough in register with the open end of the mold to permit the passage of glass into the mold. After the mold is filled, the cutter plate is given a lateral movement across the mold, the edge of the opening in said plate cooperating with the edge of the mold cavity to sever the glass in the mold. In order to hold the cutter plate in intimate contact with the bottom of the mold during the gathering and severing of the charge, the air is exhausted from grooves or depressions formed in the abutting faces of the mold and cutter plate. This results in a clean severance of the glass and practically eliminates the usual cut-off scar. Wear of the mold and cutter is reduced to a minimum as the usual violent action of a knife striking the mold is eliminated. As the cutter plate alone dips into the pool of molten glass during the gathering operation, the mold itself is protected from excessive heat. This greatly reduces or practically eliminates the scaling action and deterioration of the mold walls, so that the machine can be run for long periods without changing the molds and production is whereby greatly increased. The shape and capacity of the mold are also maintained substantially constant, thereby greatly increasing the life of the mold. Further, by keeping the mold out of contact with the supply body of molten glass and thus keeping its temperature down, the weight of the mold can be greatly reduced without danger of overheating.

Another important feature of the present invention relates to the effect of the apparatus on the glass in the gathering pool or tank. In the usual method of gathering as above noted, in which the mold dips in the glass, gathers its charge, is then lifted and a tail of glass severed, there is a great deal of chilling of the glass in the pool. The severed tail of glass is chilled by exposure to the air and the rapid stroke of the knife throws this chilled glass, spreading it over the surface of the pool and often trapping air. In order to avoid drawing these chilled portions and air bubbles into succeeding molds, it is the usual practice to provide a continuously rotating tank so that a fresh surface may be presented to each mold. Such tanks are not entirely effective for their intended purpose.

An object of the present invention is to overcome the objections just noted, and for this purpose the cutter plate is maintained in floating contact with the glass during the gathering and severing operation, so that only a small stub of glass in addition to that which enters the mold, is raised above the level of the supply pool. When severance takes place, this stub of glass immediately settles down to the general level of the glass without trapping air or introducing greatly chilled portions. It thus becomes practical with the present invention to eliminate the usual revolving tank. Moreover, the severed stub of glass is carried by the cutter to a position at one side of the gathering point so that when the cutter is used with a ram type machine or other machine gathering from a stationary pool, undue chilling of the glass at the gathering point is prevented.

Other objects of the invention will appear hereinafter.

In the accompanying drawings:

Fig. 1 is a side elevation of a portion of a machine embodying our invention. The gathering mold and the cut-off plate are shown in gathering position.

Fig. 2 is a similar view showing, particularly, the cutter and its operating mechanism after the glass has been severed and the cutter dropped away from the mold.

Fig. 3 is a section at the line III—III on Fig. 2.

Fig. 4 is a sectional front elevation of mechanism shown in Fig. 1.

Fig. 5 is a section at the line V—V on Fig. 4.

Fig. 6 is a sectional elevation at the line VI—VI on Fig. 4.

Fig. 7 is a perspective view of the bell crank lever for lifting and lowering the cutter.

Fig. 8 is a bottom plan view of the blank mold, the view being taken at the line VIII—VIII on Fig. 6.

Figs. 9 to 16, inclusive, illustrate a modified construction in which the mold is formed with a single mold cavity.

Fig. 9 is a section at the line IX—IX on Fig. 10.

Figs. 10 to 15, inclusive, are sectional elevations, partly diagrammatic, showing the relation of the gathering mold and cutter at successive periods during their operation.

Fig. 10 shows the cutter swung into position beneath the mold before dipping into the glass.

Fig. 11 shows the cutter in dip and vacuum applied for gathering a charge of glass.

Fig. 12 shows the position of parts immediately after the glass has been severed.

Fig. 13 indicates the blowing of the parison in the mold while the cutter plate is still held against the bottom of the mold.

Fig. 14 shows the cutter plate dropped away from the mold.

Fig. 15 shows the body blank mold open and the bare parison suspended from the neck mold.

Fig. 16 is a part sectional plan view showing the cutter arm in the relation to the mold indicated in Fig. 12.

Figs. 17 and 18 illustrate a further modification in which the vacuum for holding the cutter plate against the mold is transmitted through the cutter shaft and arm. Fig. 17 is a sectional elevation of such mechanism. Fig. 18 is a section at the line XVIII—XVIII on Fig. 17.

Fig. 19 is a sectional elevation of a gathering mold and cutter showing a further modification.

Figs. 20, 21 and 22 illustrate a modification in which the glass is severed by a double or reciprocating movement of the cutter. Fig. 20 illustrates the position of the cutter at the end of its cutting stroke in one direction, the glass being partly severed. Fig. 21 shows the cutter at the completion of its cutting stroke in the opposite direction, the glass being completely severed. Fig. 22 is a partly diagrammatic plan view showing the mechanism for reciprocating the cutter.

Figs. 23, 24 and 25 illustrate a modification comprising means for imparting a step-by-step rotation to the cutter plate. Fig. 23 is a sectional plan view of such mechanism. Fig. 24 is a sectional elevation of the same. Fig. 25 is a section on a larger scale at the line XXV—XXV on Fig. 23.

The invention may be adapted to various types of machines, as for example, the ram type in which a gathering ram is projected into a stationary tank, or the Owens type, in which the glass is gathered from a rotating pot. The invention is illustrated in the accompanying drawings, see particularly Figs. 1 to 8, as adapted to an Owens type suction gathering machine such as shown, for example, in the patent to La France, No. 1,185,687, June 6, 1916. Such machine comprises a mold carriage rotating about a vertical axis and having mounted thereon a plurality of heads or units. Each unit comprises a dip head frame 30 (Figs. 1 and 4) on which is supported a glass gathering mold and associated mechanism. The frame 30 is mounted in guides 30ª on the mold carriage for up and down movement required for the gathering operation. The gathering mold includes a body blank mold 31 and a neck mold 32, each comprising horizontally separable sections. The blank mold sections are carried on arms 33 and the neck mold sections on arms 34, said arms mounted to swing about a vertical shaft 35 for opening and closing the molds.

As the mold carriage rotates, the gathering molds are brought in succession to a position over a supply body or pool of molten glass 36. The frame 30 is then lowered in the usual manner to bring the mold into operative relation to the pool of glass so that a charge of glass may be introduced into the mold by suction. In accordance with the present invention, however, the gathering mold is held a short distance above the level of the supply body of glass during the gathering operation and does not come in contact with the glass at any time, except that portion which enters the mold cavities.

A cutter plate 37 is arranged to be brought beneath the gathering mold and held against the bottom of the mold during the gathering operation, in a manner hereinafter fully set forth. This plate is provided with openings 38 extending therethrough, said openings being in register with mold cavities 39 in the blank mold. When the mold is lowered for gathering, the plate 37 dips into or contacts with the pool of glass and the openings 38 provide a passageway through which the glass enters the molds.

When the parts are brought to the charge gathering position, the air is exhausted from the molds in the usual manner through a vacuum pipe 40 (Fig. 4) which exhausts the air from a vacuum chamber 41 formed in a blow head 42. A plunger head 43 carries plunger tips 44 which project into the neck mold during the gathering operation and cooperate with the neck mold in the usual manner to shape the neck of the article and form an initial blow opening. After the charges of glass have been drawn into the mold cavities, the cutter plate 37 is moved across the bottom of the mold, as hereinafter set forth, to sever the glass. The plunger head 43 is then lifted by means of a rack 45 and quadrant 46, after which a slide 47 (Fig. 13) is moved over the blow head 42. Air under pressure is then applied through a pipe 48 to the blow head and expands the parison of glass in the gathering mold. The body mold 31 is then opened, leaving the bare parison suspended from the neck mold, after which the finishing mold encloses the parison which is then blown to finished form in the usual manner.

The cutter plate 37 is carried on a rock arm 49 formed integral with a sleeve 50 fixed to the lower end of a rock shaft 51. The arm 49 is provided with an opening 52 through which the body of the cutter plate extends, said plate being formed with a flange portion 53 which seats on the arm. The cutter plate fits freely in the arm 49 to permit up and down movement therein and can be lifted out of said arm for removal from the machine.

The cutter shaft 51 extends vertically through a sleeve 54 and is clamped therein by means of a locking bolt 55 (Figs. 2 and 3). The bolt 55 is formed with a recess 56 opposite the shaft 51. A nut 57 normally holds the bolt in clamping engagement with the shaft 51 to prevent relative movement of the shaft and sleeve. By loosening said nut, the shaft is released to permit vertical and rotative adjustment of the shaft and cutter plate relative to the sleeve 54 in the manner hereinafter pointed out. The sleeve 54 is journalled in an upper bearing sleeve 58 on a bracket 29 secured to the mold carriage; and a lower bearing sleeve 59 on the frame 30. These bearings permit rocking movement of the sleeve 54 and cutter shaft, and also up and down movement relative to the mold carrying frame.

Keyed to the upper end of the sleeve 54 is a pinion 61 with which meshes a rack 62 connected through a rod 63 (Fig. 2) with a head 64 carrying a cam roll 65 running on a stationary cam 66. This cam operates, as the mold carriage rotates, to impart a reciprocating movement to the rack 62, thereby rocking the sleeve 54 and cutter shaft 51 as hereinafter described. A coil spring 67 interposed between the head 64 and the end of the rod 63 permits said head to be moved independently of the rod if any obstruction prevents the rocking movement of the cutter shaft and arm, thus serving as a safety device.

The cutter shaft and arm are raised and lowered by means of a stationary cam 68 on which runs a roll 69 on a slide block 70 connected through a link 71 to a bell crank lever 72 (Figs. 1, 2 and 7) having a pivotal connection 73 with the frame 29. The bell crank lever comprises a vertically disposed arm having an offset portion 74 to which the link 71 is pivoted at 75. The horizontal arm of the bell crank lever is formed with a forked end provided with bearing lugs 76 which engage trunnions 77 (Figs. 1, 2 and 4) formed on a collar 78 which surrounds the sleeve 54. The collar 78 fits in an annular bearing recess formed in the sleeve 54, said sleeve being free to rotate in said collar.

The shaft 51 is adjustable vertically within the sleeve 54 for adjusting the cutter plate up and down. This adjustment is effected by means of a hand wheel 79 attached to a sleeve 80 which is threaded on the shaft 51. A ring 81 bolted to the gear 61 engages a flange on the sleeve 80 and prevents up and down movement of said sleeve relative to the gear, while permitting rotative movement of the sleeve on the shaft. In order to adjust the shaft vertically, the locking nut 57 is first loosened and the hand wheel 79 then operated to move the shaft up or down, after which the locking nut 57 is again set up to lock the parts in adjusted position.

As indicated in Fig. 5, the shaft 51 may be rocked through an angle sufficient to swing the cutter plate 37 from the full line position beneath the gathering mold to the dotted line position in which the cutter plate is entirely clear of the gathering mold head. As the mold carriage rotates and the gathering mold approaches the gathering position, but before it is lowered for the gathering operation, the cutter plate is swung into position beneath the mold. During this swinging movement, the cutter plate is held by the cam 68 a short distance below the bottom of the mold and out of contact therewith.

When the cutter plate reaches a position directly beneath the mold, the shaft 51 is moved upward by the cam 68 to lift the cutter plate into a position in close proximity to but not touching the bottom of the mold. This upward movement is limited by a pair of rings 82 and 84 (see Figs. 4 and 10) secured, respectively, to the bearing sleeve 59 and the sleeve 54. These rings are formed on their outer faces with raised bosses or cam lobes 83 arranged at intervals around the rings. When the cutter plate is directly beneath the mold with the mold cavities in register with the openings 38 in the cutter plate, the bosses 83 on the two rings are opposite each other and limit the upward movement of the cutter shaft, as shown, for example, in Figs. 4 and 10. The cutter shaft 51 is held in this position with a yielding pressure by means of a spring 85 (Fig. 2) interposed between the slide block 70 and the outer end of the rod 71.

While the cutter is beneath the mold in the position just described, the mold passes over the rim of the gathering pot or tank. The frame 30 is then lowered to move the mold and cutter downward so that the cutter plate is brought into floating contact with the pool of glass. During this downward movement of the frame 30, the bearing sleeve 59 thereon, forces the cutter shaft and cutter to move downward with the mold, the cutter arm 49 being held in the spaced relation to the mold shown in Figs. 1 and 10. When the cutter plate contacts with the glass, it tends to float or lift the cutter plate upward in the arm 49 and this in combination with the vacuum applied between the cutter plate and the bottom of the mold, as presently described, holds the cutter plate in intimate contact with the mold bottom while a charge of glass is gathered by suction. The rings 82, 84 serve to hold the arm 49 in such position that the cutter plate can have a floating movement and thus accommodate itself to the shape of the mold, whereby leakage is prevented. In order to hold the cutter plate in close contact with the mold during the gathering and shearing operations, provision is made for applying a partial vacuum between the upper surface of the cutter plate and the lower surface of the mold. For this purpose, the bottom surface of the mold is formed with depressions 86 (see Figs. 4, 6 and 8) which, as shown, are crescent shaped and provide areas over which the vacuum is effective for holding the cutter plate against the mold. Openings 87 are bored through the mold sections and provide channels communicating at their lower ends with the depressions or vacuum chambers 86, and at their upper ends with the vacuum chamber 41. When the air is exhausted from the mold cavities for charging the molds, the air is at the same time exhausted from the chambers 86 so as to draw the cutter plate tightly against the mold. The spacing between the cutter plate and mold (Fig. 10) is preferably narrow enough to permit the plate to be lifted by suction alone, although the buoyancy of the glass or its upward pressure against the plate will usually lift the plate before suction is applied.

The lower ends of the mold sections 31 may consist of wear plates 88 (Figs. 4 and 8) removably attached to the body of the mold by screws 89. These wear plates are preferably made of a metal which will withstand high temperatures as well as being very hard and resistant to wear. A high speed tungsten alloyed steel has been found suitable for this purpose, although other metals might be used.

Figs. 9 to 16, inclusive, illustrate a modified form of cutter plate 37ᵃ having a single opening 38 adapting it to a mold 31ª having a single mold cavity 39. The method of gathering glass and the operation of the cutter plate with this form are the same as with the construction shown in the other views in which plural cavity molds are employed. The several steps in the operation of gathering and severing a charge of glass in forming the parison are illustrated in Figs. 10 to 15 and may be briefly described as follows: The cutter plate is first swung beneath the mold (Fig. 10) before the mold is brought over the glass. After the mold and cutter plate are brought over the glass, they are lowered as already described so that the plate floats in the glass. Air is then exhausted from the mold cavity so that the latter is filled with glass, as shown in Fig. 11. The application of vacuum to the mold cavity at the same time exhausts the air from the vacuum chambers 86 between the mold and cutter plate, thereby holding said plate tightly against the mold. While the vacuum is still applied, the cutting stroke takes place. This is effected by the cam 66 which rocks the cutter arm through a small angle sufficient to move the cutter plate to the Fig. 12 position, thereby shearing off the glass at the meeting plane of the cutter plate and bottom of the mold. This shearing action takes place before the vacuum is released and while the cutter plate is still in contact with the supply body of glass.

The shearing edge of the cutter plate formed by the upper edge of the opening 38, may be circular as shown in Fig. 9, or of some other contour. As shown in Fig. 5, the opening is shaped to provide convergent cutting edges which meet in a point 38ª. This point is preferably so located that the radial line from said point to the center of the opening is about tangent to the arc of movement of said center about the axis of the shaft 51. The arrangement is such that the convergent cutting edges meeting in the point 38ª form the shearing edges of the cutting plate. This provides a very effective form of shear, allowing a gradual severance of the glass and also reducing any tendency for a fin or film of glass to be drawn between the cutter plate and the bottom of the mold. The orifice forming the cutting edge of the cutter plate is preferably substantially the same size as the opening in the bottom of the mold.

The use of vacuum to hold the cutter plate against the mold during the shearing action, serves the very important function of maintaining a perfect shearing contact between the mold and said plate so that there is a clean severance of the glass. This reduces to a minimum, or practically eliminates, the usual shear mark. It will be observed that only a short movement of the cutter plate relative to the mold is required to shear the glass. As said plate and mold are held in contact throughout this cutting stroke, a very smooth action is obtained. The violent action of the usual form of cut-off knife being swung across the mold, is eliminated. As there is little wear of either the cutter or the mold with this method of severing the glass, they can be operated for long periods without the need of removing them from the machine for grinding or resurfacing.

It will be further noted that as the shear takes place while the cutter is still in the glass, there is no tendency for the glass to be pulled downward out of the mold before severance.

After the cutting stroke, the mold and cutter plate are moved upward to lift the cutter plate out of the glass, as shown in Fig. 12. This permits the stub of glass $b$ within the opening 38 to sink back into the pool.

The movement of the cutter plate in severing the glass, carries the stub $b$ to one side of the mold cavity. The cutter shaft may be arranged to swing the cutter plate in any preferred direction,—preferably in such direction that the stub of glass $b$ is carried laterally out of the path of the succeeding molds and cutter plates. When the invention is used in connection with the usual continuously rotating gathering tank, the cutter plate is so arranged that during the cutting stroke it is carried laterally either inward toward the center of the tank or outward toward the rim of the tank. In this manner, the stub portions of glass which are chilled to a certain extent by contact with the cutter plate are released at a position where they have opportunity to be reheated and completely reassimilated in the supply body of glass in the tank before again coming within range of the gathering molds.

As the shaft 51 rocks to effect the cutting operation, the ring 84 is rotated to the Fig. 12 position, in which the cam lobes 83 thereon are moved into staggered relation to the lobes on the ring 82, thereby permitting the shaft 51 under the influence of the spring 85 (Fig. 2) to be moved upward into position to hold the cutter plate against the mold, the vacuum being cut off preferably immediately after the cutting stroke. While the cutter plate is thus held against the mold, forming a bottom for the mold cavity, the plunger is withdrawn and air under pressure applied, as heretofore noted, to expand the parison in the mold as shown in Fig. 13. The cutter plate is now lowered to the Fig. 14 position before it is swung laterally away from its position beneath the mold. This lowering of the cutter plate allows the glass to sag downward below the bottom surface of the mold without danger of being dragged to one side by the lateral movement of the cutter. A spring 70ª (Fig. 2) provides a yielding connection between the slide block 70 and the rod 71 which serves as a safety device in the event of any obstruction hindering the lowering of the cutter shaft.

It will be observed that the walls of the opening 38 through the cutter plate are flared downwardly and outwardly. This permits a free passage of the glass upward into the mold and also facilitates the downward movement of the stub of glass contained in said opening after the cutting stroke and permits it to be readily assimilated in the supply body of glass.

Figs. 17 and 18 show a modified construction in which the vacuum grooves or chambers 86ª are formed in the upper surface of the cutter plate instead of the lower surface of the mold. The air is exhausted through a pipe 90 connected to the bearing sleeve 59 and communicating with a central bore or passageway 91 extending through the shaft 51. This passageway is extended through the arm 49 and a passageway 92 in the cutter plate to one of the chambers 86ª. A groove 93 in the upper face of the cutter plate provides communication between the two chambers 86ª. When the shaft 51 is rocked to swing the cutter plate into position beneath the mold, a port 94 in the sleeve 54 is brought into register with the vacuum pipe 90, permitting the air to be exhausted so that the cutter plate is held against the mold. The cutting stroke carries the port 94 out of register with the vacuum tube 90 so that the vacuum is released, the cutter then being held against the mold independently of the vacuum in the manner heretofore pointed out.

Fig. 19 shows a cutter plate formed with a recess 95 in its upper face in position to be brought into register with the mold cavity as shown, at the completion of the cutting stroke. This recess 95 preferably conforms to the shape of the lower end of the mold cavity and in effect forms a continuation of said cavity, so that when air pressure is applied to expand the parison, the glass enters the cavity 95. The main purpose of this construction is to eliminate any cut-off scar that might otherwise appear.

Figs. 20, 21 and 22 illustrate a modified method of severing the glass, in which the cutter plate is given a reciprocating stroke during the severance. The initial severing movement of the cutter is a short forward stroke which carries the cutter plate to the position shown in Fig. 20 in which the cutting edge of said plate has been moved part way across the opening of the mold cavity, thus partially severing the glass. The cutter plate is then moved in the reverse direction to completely sever the glass. The purpose of this method of severing may be explained as follows:

As the cutter advances to the Fig. 20 position, it has a tendency to push the glass away from the left hand edge of the mold opening as indicated at 97. At the same time there is a tendency to crowd the glass against the opposite edge 98 of the mold. During the reverse movement of the cutter to the Fig. 21 position, the tendency to crowding of the glass against the edge 98 is counteracted. A clean severance of the glass is thus obtained and the tendency to the formation of a cut-off scar owing to the crowding of the glass to one side during the cutting stroke, is overcome. Fig. 22 illustrates the manner in which this reciprocating movement is imparted to the cutter. As the cam roll 65 traverses the part 66ª of the cam, the rack 62 is moved forward a sufficient distance to swing the cutter plate 37ª to the full line position, i. e., the position shown in Fig. 20.

When the cam roll enters the section 66ᵇ of the cam track, the cutter is moved to the Fig. 21 position indicated at 37ᵇ in Fig. 22. The cutter is held at rest in this position while the cam roll traverses the dwell portion 66ᶜ of the cam track. While at rest in this position, the parison is blown in the mold as heretofore described, after which the cutter is swung to the position 37ᶜ (Fig. 22) entirely clear of the mold.

Figs. 23, 24 and 25 illustrate a construction in which provision is made for imparting a step by step rotation to the cutter plate within the arm 49 for the purpose of distributing the wear on said plate and particularly the cutting edge. The upper flange portion of the cutter plate is formed with ratchet teeth 100. An arm 101 is connected by a pivot 102 to the rock arm 49. A pawl or dog 103 is pivotally connected to the arm 101 and is yieldingly held in contact with the ratchet teeth by a leaf spring 104. The arm 101 is provided with a lug 105 which is yieldingly held against an adjustable stop 106 by means of a spring 107, thus limiting the movement of the arm 101 in one direction. As the knife arm swings forward during the cutting stroke, the forward end of the arm 101 strikes a stop 108 on the mold so that during the final movement of the rock arm 49, the arm 101 is swung about its pivot and causes the dog 103 to rotate the cutter plate. During the return movement of the rock arm, the arm 104 is carried away from the stop 108 so that the spring 107 returns the arm 101 to again engage the stop 106. In this manner the cutter is given a step rotation about its own axis each time it operates to sever a charge of glass. A spring actuated detent 109 bears against the ratchet teeth and holds the cutter in its adjusted position. The stop 106 is adjustable to vary the range of movement of the arm 101 so that the cutter may be rotated through an angular distance corresponding to two or more ratchet teeth as may be desired.

Various modifications may be resorted to within the spirit and scope of the invention.

What we claim is:

1. In a machine for forming hollow glass articles, the combination of a mold carriage, a mold thereon, a rock shaft, a rock arm thereon, a cutter plate carried on said arm, means for rocking said shaft and arm and thereby moving the cutter plate laterally into and out of a position beneath the mold, means for holding the cutter plate out of contact with the mold during its movement into said position, means for lowering the mold and cutter plate to dip said plate into a pool of molten glass while the mold is out of contact with the glass, said plate having an opening therethru in register with the mold cavity, said plate having a floating connection with the rock arm, permitting it to move upward into engagement with the mold while in said dipping position, the opposite faces of the mold and cutter plate being relatively formed to provide a vacuum space or chamber, means for exhausting the air from the mold and causing glass from the supply pool to move upward thru the opening in the cutter plate and fill the mold, means for exhausting the air from said vacuum chamber and thereby causing the cutter plate to be held against the mold, means for rocking said shaft and thereby moving the cutter plate laterally to shear the glass while said plate is held against the mold by suction and bring the plate to a rest position in which it forms a closure for the mold cavity, means to then hold said plate against the mold independently of suction, means to apply air pressure thru the upper end of the mold and complete the formation of a parison therein while the cutter plate is held in said rest position, and means to then operate said rock shaft and move the cutter plate downwardly out of contact with the mold and swing it laterally from beneath the mold.

2. The combination of a mold open at its lower end to receive a charge of glass, a floating cutter plate beneath and spaced from the mold, and means for lowering the mold and cutter plate to contact the plate with a supply body of molten glass, said plate being movable by the buoyancy of the glass into engagement with the mold and having an opening therethrough for the passage of glass into the mold.

3. The combination of a mold open at its lower end to receive a charge of glass, a floating cutter plate beneath and spaced from the mold, means for lowering the mold and cutter plate to contact the plate with a supply body of molten glass, said plate being movable by the buoyancy of the glass into engagement with the mold and having an opening therethrough for the passage of glass into the mold, and means to move said plate laterally and thereby shear the glass at the meeting plane of the cutter and mold.

4. The combination of a mold open at its lower end, a cutter plate therebeneath, and a support on which said plate is mounted, said plate having an opening extending therethrough to register with the mold cavity, the walls of said opening being downwardly and outwardly flared, said walls forming with the upper face of the plate a cutting edge, said plate being formed with a peripheral flange, said support being formed with an opening therethrough to receive said plate and having a bearing surface surrounding said opening, on which surface said peripheral flange is seated.

5. The combination of a mold open at its lower end, a circular cutter plate beneath the mold and formed with an opening extending therethrough providing a cutting edge at the upper periphery of the opening, said plate having a peripheral flange formed with ratchet teeth, a supporting element formed with an opening to receive said plate and a bearing surface surrounding said opening on which surface said flange is seated, and means for rotating the cutter plate on said support including a pawl engaging said ratchet teeth.

6. The combination of a mold having a bottom opening to receive a charge of glass, a cutter plate beneath the mold and formed with an opening extending therethru in register with said charge receiving opening, a rock arm carrying said plate, said plate being free for universal movement relative to said arm, and means for rocking said arm and thereby moving the plate across the bottom of the mold for severing the glass.

7. The combination of a mold having a vertically disposed mold cavity, a rock shaft, a rock arm thereon, a cutter plate carried by said arm and having a floating connection therewith, means to rock said shaft and thereby swing the cutter plate into and out of position beneath the mold, and means for causing an upward movement of the cutter plate relative to said arm into engagement with the mold.

8. The combination of a mold having a vertically disposed mold cavity, a rock shaft, a rock arm thereon, a cutter plate carried by said arm and having a floating connection therewith, means to rock said shaft and thereby swing the cutter plate into and out of position beneath the mold, means for causing an upward movement of the cutter plate relative to said arm into engagement with the mold, said plate having an opening therethru adapted to register with the mold cavity, means for bringing said plate and mold over a pool of molten glass, and means for applying suction to the mold and causing the glass to enter the mold thru the opening in said plate.

9. In a machine for forming glass articles, the combination of a mold, a rock shaft, a rock arm thereon, a cutter plate freely supported on said arm for up and down movement relative thereto, and means for rocking said shaft and thereby swinging the cutter plate into and out of position beneath the mold.

10. In a glass forming machine, the combination of a rock shaft, a rock arm thereon, a cutter plate supported on said arm, said arm formed with an opening to receive said plate and the plate being formed with a peripheral flange to seat on said arm.

11. Glass severing apparatus comprising the combination of shear elements, means for holding said elements in contact by a differential pneumatic pressure, means for imparting a shearing movement to one of said elements during the application of said pressure, and means for neutralizing said pressure after the shearing operation is completed.

12. The combination of a mold, a cutter, means to move said cutter across the face of the mold, means for holding the cutter against said face by a differential pneumatic pressure throughout said movement, and means for neutralizing said pressure after the cutter has completed its said movement.

13. The combination of a mold, a cutter, means to move said cutter across the face of the mold, and means for holding the cutter against said face by suction throughout said movement.

14. In a machine for forming glass articles, the combination of a mold, means for moving the mold into a charging position over a pool of molten glass, means for drawing glass from the pool into the mold by suction, a cutter movable across the lower face of the mold for severing the charge of glass, and suction means for holding the cutter in contact with the mold throughout the severance of the glass.

15. In a glass forming machine, the combination of a mold open at its lower end, a plate beneath the mold, said plate having an opening therethru in register with the mold cavity, means for moving the mold and plate into operative relation to a pool of molten glass with said plate in contact with the glass, means for exhausting the air from the mold and causing the glass to be drawn upward thru said plate into the mold, the contacting faces of said mold and plate being relatively shaped to provide an air pocket or chamber, and means providing a vacuum line extending to said pocket independently of the mold for exhausting the air from said pocket and thereby holding the plate against the mold while the latter is receiving its charge of glass.

16. In a machine for forming hollow glass articles, the combination of a mold carriage, a mold carrying head thereon, a rock shaft, a rock arm on said shaft, a cutter plate supported on the rock arm and free for universal movement relative to said arm, means to rock said shaft and swing the cutter plate beneath the mold but out of contact therewith, means to lower said head and thereby lower the cutter plate into contact with a pool of molten glass and cause said plate to be moved into contact with the mold, means to hold said plate by suction in contact with the mold, means to introduce glass from the pool into the mold by suction, and means to rock said shaft and thereby cause the cutter plate to sever the glass while said plate is held by suction.

17. In a machine for forming hollow glass articles, the combination of a mold carriage, a mold carrying head thereon, a rock shaft, a rock arm on said shaft, a cutter plate supported on the rock arm and free for universal movement relative to said arm, means to rock said shaft and swing the cutter plate beneath the mold but out of contact therewith, means to lower said head and thereby lower the cutter plate into contact with a pool of molten glass and cause said plate to be moved into contact with the mold, means to hold said plate by suction in contact with the mold, means to introduce glass from the pool into the mold by suction, means to rock said shaft and thereby cause the cutter plate to sever the glass while said plate is held by suction and while said plate remains in contact with the pool of glass, means to then lift said head, means to move the cutter plate downward away from the mold, and means to rock said shaft and carry the cutter plate laterally to a position at one side of the mold.

18. In a machine for forming hollow glass articles, the combination of a mold, means to bring the mold to a charge gathering position over a supply body of molten glass, means to exhaust the air from the mold and cause an upward movement of glass from the supply body into the mold, a cutting device having cutting edges, means to move said cutting device in one direction and cause one of said cutting edges to partially sever the glass at the bottom of the mold, and means to then move the cutting device in the reverse direction and cause the other cutting edge to complete the severance of the glass.

19. In a glass forming machine, the combination of a mold open at its lower end to receive a charge of glass, a shear plate beneath the mold, said plate having an opening therethru in register with the opening in the mold, means to move said mold and plate and bring the latter into contact with a supply body of molten glass, means for exhausting the air from the mold and causing glass to move upward thru said plate into the mold, means for then moving said plate laterally a sufficient distance to partly sever the glass at the mold opening, and means to then move the cutter plate in the reverse direction a distance to completely sever the glass.

20. In a glass forming machine, the combination of a mold open at its lower end to receive a charge of glass, means for moving the mold into association with a supply body of molten glass, means for exhausting the air from the mold and causing glass to move upward from the supply body into the mold, a cutter, and means to impart a reciprocating movement to the cutter across the bottom face of the mold, the movement in one direction being to a position to partially sever the glass, and in the reverse direction to a position to complete the severance.

21. The combination of means for causing movement of glass outward from a supply body of molten glass past a cutting plane, a cutter having cutting edges, means for moving said cutter in said plane and causing one of said edges to partially sever the glass at said plane, and means to then reverse the movement of the cutter and cause the other cutting edge to complete the severance of the glass at said plane.

22. The combination of a mechanical element having an opening for the passage of molten glass, means for causing an outward movement of glass from a supply body thru said opening, a cutter device having shearing edges, means for actuating said cutter device and thereby causing a shearing movement of one of said edges transversely of said opening to a position across the opening for partially severing the glass at said opening, and means for then causing another of said cutting edges to shear across said opening in the reverse direction and thereby complete the severance of glass at the opening.

23. A glass severing apparatus comprising the combination of shear members having openings therein relatively movable into and out of register by a relative movement of the shear members, means for causing a movement of glass thru said openings while the latter are in register, and means for severing the glass by a relative movement of the shear members first in one direction a distance to partially sever the glass and then in the reverse direction a distance to completely sever the glass at said openings.

24. In a glass forming machine, the combination of a mold open at one end to receive a charge of glass, a cutter plate at said end of the mold, said plate having an opening therethru in register with the mold opening and providing a passageway thru which the glass passes into the mold, means to periodically reciprocate said cutter plate for severing the glass, and means for imparting a step by step rotation to said plate.

25. In a glass forming machine, the combination of a mold open at one end to receive a charge of glass, a cutter plate at said end of the mold, said plate having an opening therethru in register with the mold opening and providing a passageway thru which the glass passes into the mold, means to periodically reciprocate said cutter plate for severing the glass, and means for rotating said plate.

26. In a glass forming machine, the combination of a mold, a cutter plate having an opening therethru, means for periodically introducing molten glass thru said opening into the mold, and means for periodically reciprocating and rotating the cutter plate.

27. In a glass forming machine, the combination of a mold, a rock shaft, a rock arm thereon, a circular cutter plate mounted in said arm, means for periodically rocking said arm and thereby reciprocating the cutter plate, and pawl and ratchet mechanism operated by the movement of said arm for rotating the cutter plate in the arm.

28. In a machine for forming glass articles, the combination of a mold, a rock shaft, a rock arm thereon, a cutter plate freely supported on said arm for up and down movement relative thereto, means for rocking said shaft and thereby swinging the cutter plate into and out of position beneath the mold, and means operable when the cutter plate is beneath the mold to move said plate upward relative to said arm into intimate contact with the mold.

29. In a machine for forming glass articles, the combination of a mold, a rock shaft, a rock arm thereon, a cutter plate freely supported on said arm for up and down movement relative thereto, means for rocking said shaft and thereby swinging the cutter plate into and out of position beneath the mold, and means for causing the cutter plate to be held by atmospheric pressure in intimate contact with the mold.

30. In a machine for forming hollow glass articles, the combination of a mold, a cutter plate, a carrier on which said cutter plate is supported, means for operating said carrier and thereby moving the cutter plate to a position beneath but out of contact with the mold, said plate having an opening therethrough for the passage of glass into the mold, means for bringing the mold and cutter plate to a charge gathering position over a supply body of molten glass, means for causing a movement of the cutter plate relative to its carrier into engagement with the bottom of the mold, means for introducing a charge of glass by suction through said opening into the mold, means for operating said carrier and causing the cutter plate to shear across the mold and sever the glass, means operating through said carrier to clamp said plate against the mold after the shearing operation, and means to prevent said carrier from clamping said plate to the mold prior to the shearing operation.

31. In a machine for forming glass articles, the combination of a mold carriage, a mold thereon, a cutter plate, a carrier for said plate mounted on the mold carriage, means for operating said carrier to move the cutter plate to a position beneath but out of contact with the mold, means for rotating the carriage and bringing the mold and cutter plate over a supply body of molten glass, means for causing the cutter plate to move upward relative to the carrier into engagement with the mold, means for actuating said carrier to shear the cutter plate across the mold, means for moving said carrier upwardly and thereby causing it to clamp the cutter plate against the bottom of the mold, and means for preventing said upward movement of the carrier prior to said shearing movement.

32. The combination of a mold carriage, a mold thereon open at its lower end, a rock shaft on the carriage, a rock arm on said shaft, a cutter plate mounted on said rock arm, said plate having an opening therethrough, means for rocking said arm and thereby swinging said plate to a position beneath the mold but out of contact therewith, with said opening in register with the mold opening, said plate being free to move upwardly into engagement with the mold, means for rocking said shaft and thereby moving the cutter plate to a position to close the said mold opening, means operating through the rock shaft to clamp said plate against the mold when in said mold closing position, and means to prevent the rock shaft from clamping the cutter plate against the mold prior to said shearing operation.

33. The combination of a mold carriage, a mold thereon, a rock shaft on the carriage, a rock arm thereon, a cutter plate mounted on said arm, means for rocking said shaft and thereby moving the cutter plate to different positions beneath the mold, means for applying force to the rock shaft in an upward direction and thereby holding the cutter plate against the mold when in one of said positions, and means for preventing said upward force from being transmitted to the cutter plate when in another of said positions.

34. In a machine for forming glass articles, the combination of a mold formed with a mold cavity extending from one face of the mold, means for introducing molten glass into the mold, a cutter movable across said face of the mold for severing the glass, means for holding the cutter in contact with the mold by suction throughout the severance of the glass, and means for then discontinuing said suction.

Signed at Toledo, in the county of Lucas and State of Ohio, this 6th day of July, 1928.

AUGUST KADOW.
LEONARD D. SOUBIER.